United States Patent

Chapman

[11] Patent Number: 5,343,743
[45] Date of Patent: Sep. 6, 1994

[54] ASYMMETRICAL DISPLACEMENT FLOWMETER

[76] Inventor: Michael J. L. Chapman, Room 1311, Yongan Apartment, 5A Zao Ying Road, North Dongsanhuan, Beijing, China

[21] Appl. No.: 543,771
[22] PCT Filed: Mar. 6, 1989
[86] PCT No.: PCT/GB89/00223
   § 371 Date: Dec. 31, 1990
   § 102(e) Date: Dec. 31, 1990
[87] PCT Pub. No.: WO90/01146
   PCT Pub. Date: Feb. 8, 1990

[30] Foreign Application Priority Data

Jul. 28, 1988 [EP] European Pat. Off. ......... 88112208.9

[51] Int. Cl.$^5$ .............................................. G01F 1/00
[52] U.S. Cl. ................ 73/170.07; 73/170.05; 73/861.75
[58] Field of Search .............. 73/170 A, 189, 861.74, 73/861.75, 861.76, 170.05, 170.07, 170.08, 170.11, 170.15

[56] References Cited

U.S. PATENT DOCUMENTS

| | | | |
|---|---|---|---|
| 2,793,238 | 7/1956 | Watson | 73/170.07 |
| 2,857,762 | 10/1958 | Parshall et al. | 73/861.76 |
| 2,896,453 | 7/1959 | Ryan et al. | 73/861.75 |
| 2,935,872 | 6/1960 | Misner | 73/170.07 |
| 3,906,790 | 9/1975 | Brainard, II et al. | 73/170.07 |
| 3,986,396 | 10/1976 | Raymond | 73/170.07 |
| 4,091,666 | 5/1978 | Niskin | 73/170.07 |
| 4,107,989 | 8/1978 | Peters | 73/170.07 |
| 4,854,579 | 8/1989 | Baxter | 73/170.07 X |

FOREIGN PATENT DOCUMENTS

1253924 11/1967 Fed. Rep. of Germany ... 73/170.05

Primary Examiner—Richard E. Chilcot, Jr.
Assistant Examiner—Elizabeth L. Dougherty
Attorney, Agent, or Firm—Merchant, Gould, Smith, Edell, Welter & Schmidt

[57] ABSTRACT

An asymmetrical displacement flowmeter comprises a streamlined body or assembly 1 which floats or is submerged in liquid 3 and is subjected to frictional and dynamic pressure forces caused by liquid flow and tilts about axis 9 near the leading end of the body being anchored relative to the flow through tie 7 and anchor 6 or other means acting through axis 9. Degree of tilt from the vertical of body 1 about the axis is affected by the gravity restoring moment acting about the axis and can be adjusted by movement of weight 14 within the body. Pointer 12 attached to pendulum 13 about axis 9 indicates velocity of flow on scale 2 attached to body 1. In open channel depth is measured on scale 11. In closed conduit, body rotates about shaft through wall and may be folded during installation. Velocity and depth may be transmitted electronically.

5 Claims, 4 Drawing Sheets

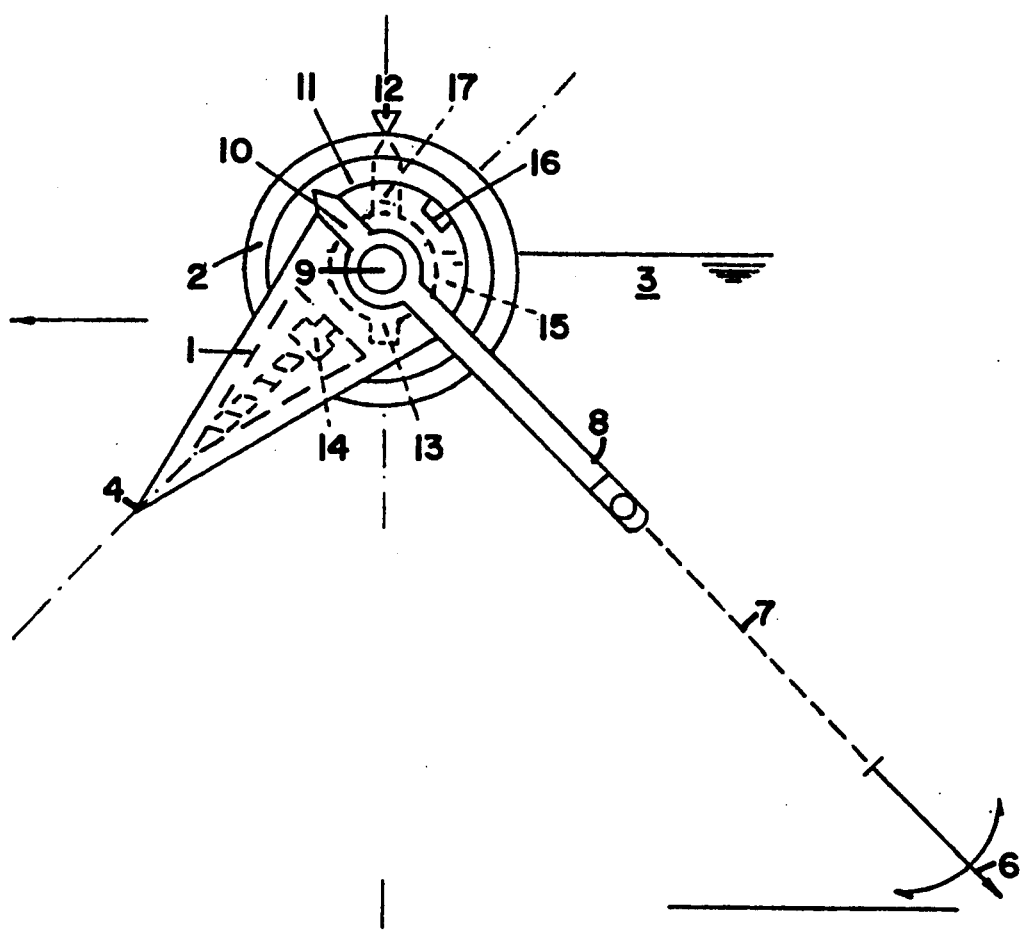

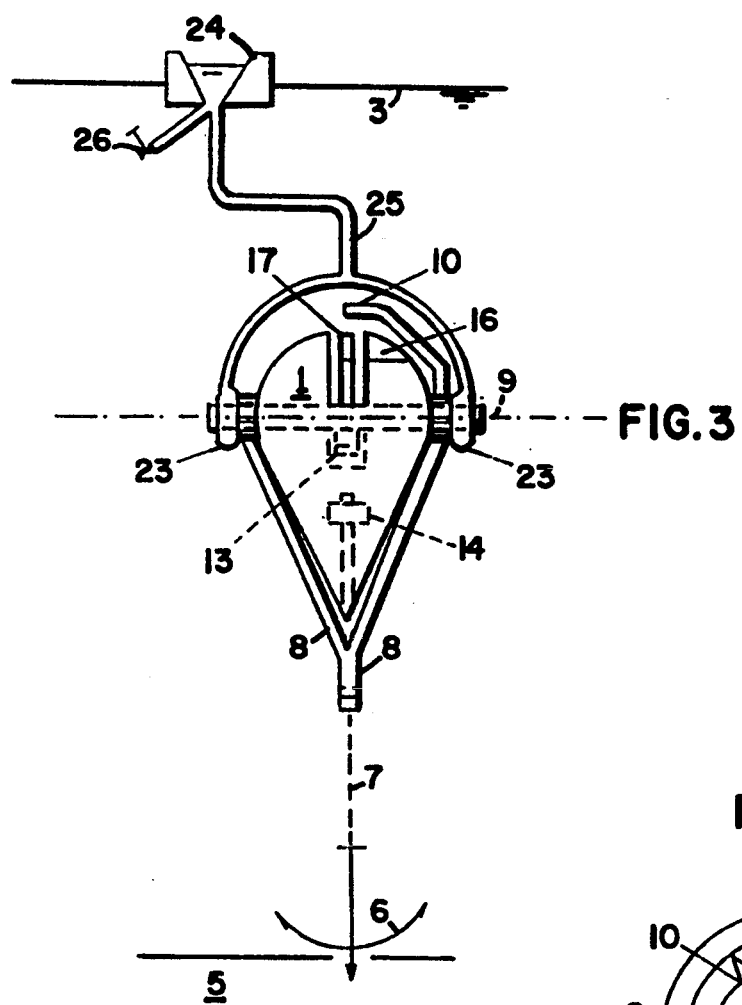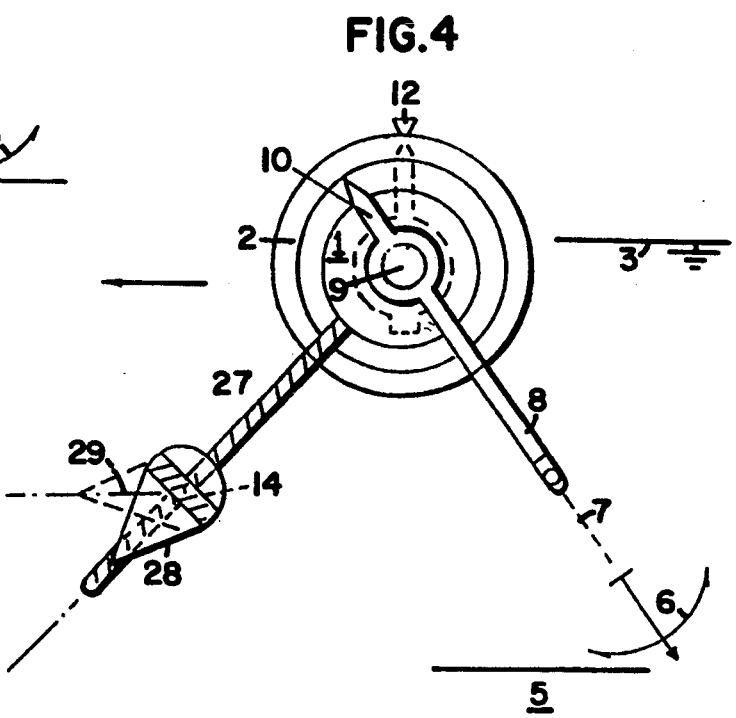

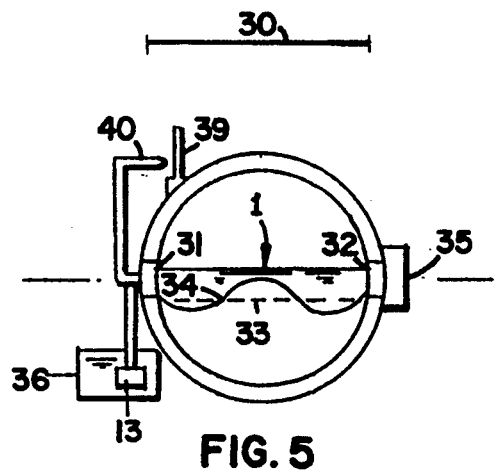
FIG. 5
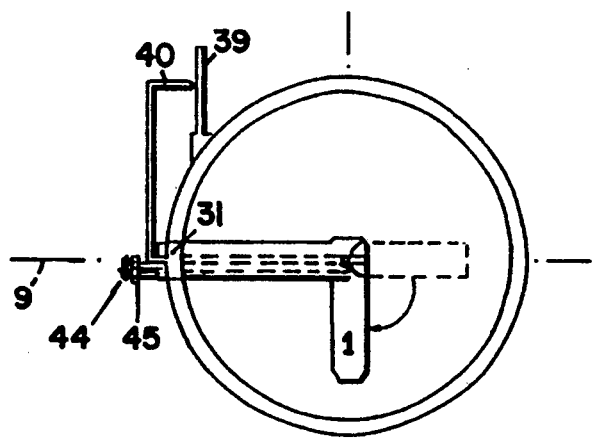
FIG. 8
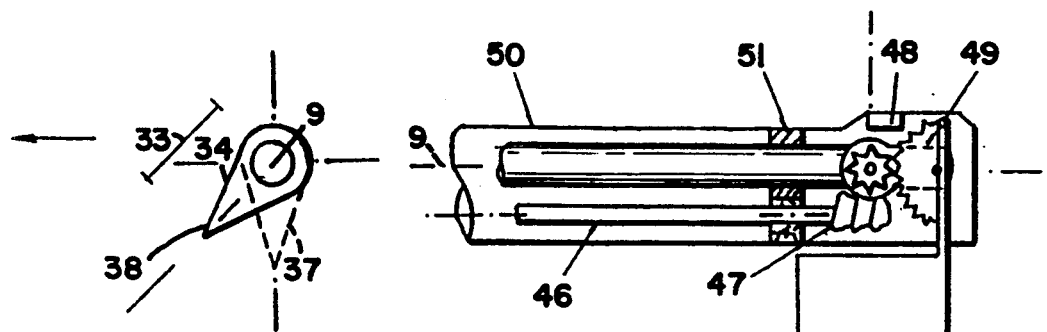
FIG. 6
FIG. 9
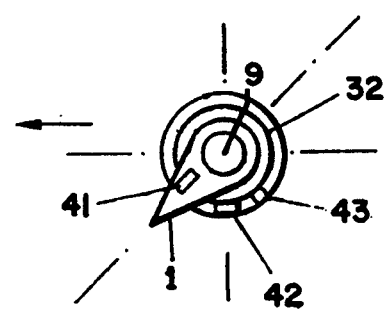
FIG. 7

ASYMMETRICAL DISPLACEMENT FLOWMETER

FIELD OF THE INVENTION

This invention relates to a liquid flow measuring device for accurately measuring the velocity and depth of flow in rivers, channels or in pipes and closed conduits.

DESCRIPTION OF THE PRIOR ART

Flowmeters for fluids are commonly used in water, oil and gas industries for measurement of velocity of flow in pipes, canals, rivers, etc. Available types include relatively expensive and sophisticated, ultrasonic, magnetohydrodynamic and differential pressure types as well as the simpler rotational, propeller, turbine and vane type, while open channel flows are frequently gauged by chemical dilution or depth measurement related to known cross sectional form.

SUMMARY OF THE INVENTION

The asymmetrical displacement flowmeter has the advantage of simplicity and cheapness. It can be used in many different forms for measurement of flow rates in closed conduits such as pipes, open channels such as rivers, streams, etc. and for a variety of fluids. Its sensitivity, accuracy and ruggedness can be easily varied to suit site conditions. For pipe flow, it can be made in a way that its dimensions are sufficiently small to allow insertion through a tapping in existing pipes without removal of the pipe and can simultaneously measure the flow across the full width of the pipe. It may also be installed and clamped from the inside without tapping or alteration of the pipe when used in conjunction with an electronic transmitter.

For open channel flow, it can be made to measure simultaneously both velocity and depth of flow thus avoiding the necessity of knowledge of the cross sectional form and can be provided with both visual an remote means of displaying the measured information.

According to the present invention there is provided an asymmetrical displacement flowmeter comprising a streamlined body being floated or submerged in a liquid, or fluid, having a leading and a trailing end, being able to tilt about an axis close to its leading end, the body or assembly being anchored relative to the flow of the fluid via a shaft passing through the axis rotation which is maintained approximately perpendicular to the direction of fluid flow and from which a short pendulum hangs within the body or outside of the influence of stream flow and is acted on by gravity to indicate the vertical, while the velocity of flow of the fluid is indicated by the angular displacement of the body from the line of the pendulum due to asymmetric frictional forces and the restoring force of the shelf weight of the streamlined body acting on the body about the axis which results in the longitudinal body axis resting in a position near the vertical or perpendicular to the conduit axis in a vertical plane during no-flow conditions and the depth of fluid may be indicated by the angular displacement of an anchor strap of know length or extension attached to the shaft axis.

BRIEF DESCRIPTION OF THE DRAWINGS

Specific embodiments of the invention will now be described by way of examples with reference to the accompanying drawings in which:

FIG. 1 shows a side elevation of single body flowmeter adapted for open channel flow;

FIG. 2 shows an elevation of depth measuring attachment for open channel flowmeter;

FIG. 3 shows details of depth adjustment for open channel flowmeter;

FIG. 4 shows side elevation of alternative multiple body flowmeter;

FIG. 5 shows transverse cross section of closed conduit flowmeter;

FIG. 6 shows longitudinal central cross section of closed conduit flowmeter;

FIG. 7 shows longitudinal end cross section of closed conduit flowmeter;

FIG. 8 shows transverse cross section of closed conduit folding flowmeter;

FIG. 9 shows a detail of closed conduit folding flowmeter;

Figure 10:
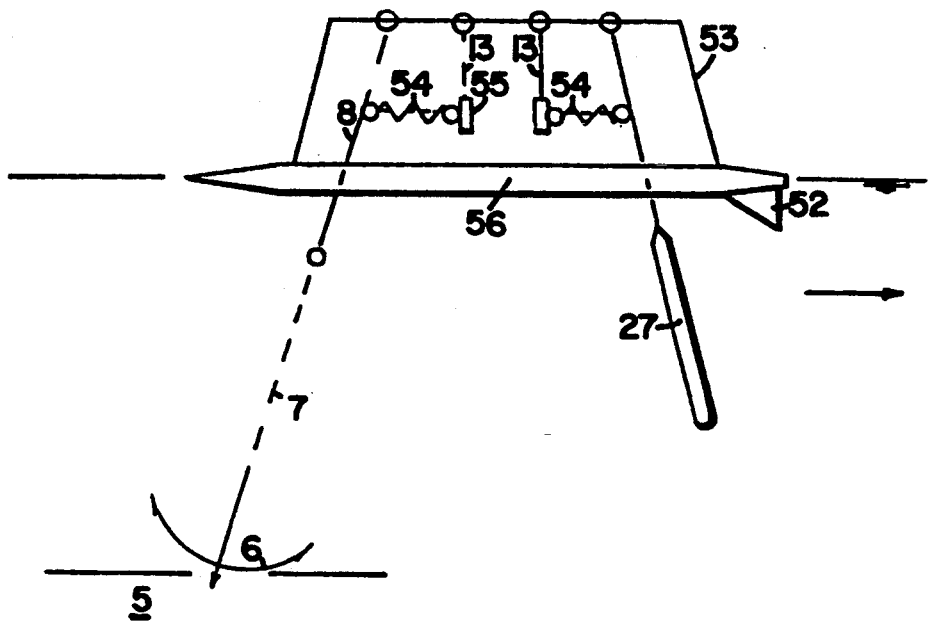
FIG. 10 shows an elevation of a float supported flowmeter for open channel.

Referring to the drawings, the flowmeter may take one of six main forms as follows:

Type A: Single bodied form for open channel flow
Type B: Multi bodied form for open channel flow
Type C: Single bodied fixed form for closed conduits
Type D: Multi bodied form for closed conduits (not shown in figure)
Type E: Single bodied folding or extending form for closed conduits
Type F: Float support form for open channel flow

DETAILED DESCRIPTION OF MODES FOR CARRYING OUT INVENTION

Referring to FIG. 1, the type A flowmeter comprises a hollow body 1 consisting of a top half of convex hemispherical form releasably secured and sealed by for example a screw thread with rubber gasket (not shown) to a bottom half right circular conical form and with circular outer scale 2 fixed to the top. This body floats or is submerged in the fluid 3 with its apex 4 pointing generally downward due to the force of gravity and is anchored relative to the channel bed 5 by means of an anchor 6 or other tethering device attached via an adjustable or fixed length tie 7 of known length and with generally light weight and low frictional resistance so that it maintains an approximately straight line between the anchor and the floating body. The tie 7 is in turn attached to the lower end of a pointer arm 8 which is free to tilt about an axis 9 being mounted on a shaft (not shown) passing through the upper part of the body 1. The upper end of the pointer arm 10 is used to indicate the depth of the flowmeter above the channel bed on the inner scale 11 which is graduated according to the length of the tie 7 or a unit length if so desired. The pointer 12 which remains in the vertical position due to the effect of gravity on the pendulum 13 and pointer assembly integral with inner scale 11 is free to tilt about an axis 9 and indicates the velocity of flow of the fluid on the outer scale 2 which is calibrated according to the type of fluid, etc. Effective range and sensitivity of the velocity measurement are adjustable by means of a movable mass 14 which can be screwed along the longitudinal axis of the cone and locked in position prior to scale calibration thus varying the rate of tilt of the body 1 from the vertical due to the asymmetrical frictional force of the fluid about the axis 9. Damping of the velocity 12 pointer oscillation is achieved by the frictional resistance to motion of the pendulum 13 in the fluid which is allow to flood the pendulum channel 15. For stability of the flowmeter in open channel flow, external guide fins may be added to the downstream side of body 1.

Remote transmission of depth and velocity can be made through conversion of these measurements to electronic pulse for analogue measurements by conventional techniques such as optometric, sonic, or by capacitance or electromagnetic proximity types, the sensors being connected to the pointer 10 for depth measurement and to the upper body 16 for velocity measurement with the light emitters, etc. located on the pointer base 17. Compensation for variation in temperature and power supply is provided electronically and in the case of optometric systems compensation for variation in fluid turbidity is included making use of a fixed or adjustable emitter to sensor separation providing feedback to the main system.

The main advantage of the Type A flowmeter over the Type B multibodied form is the less complicated profile which is not so likely to collect debris, algae, etc. Generally the sensitivity of the flowmeter to different velocity ranges is dependent on the relative overall density of the body employed, the heavier type being suitable for higher flow rates.

Referring to FIG. 2, depth measurement for the type A or B flowmeter can usefully be enhanced to take account of large variations in channel flow depth by inclusion of spring coiling tie 7 which passes between rollers 18 located on the lower pointer arm 8 and around a spring drum 19 with rotation stop 20 which is resisted by spring 21 attached to pointer 10 but activates directly pointer 22 which indicates depth by taking account of both extension of tie 7 and the angle that the tie makes with the vertical.

Referring to FIG. 3, adjustment of operational depth of the flowmeter can be made by flooding the body of the flowmeter or by use of supplementary float cells 23 attached symmetrically on both sides of the flowmeter and free to turn about the axis. The float cells are partly filled with fluid to an extent determined by the level of fluid in the floating reservoir 24 which is connected to the float cells by flexible light weight hollow tubes 25. The level of fluid in the reservoir 24 may be lowered by opening of the valve 26, or raised by direct filling from any suitable container or pipe. Graduations within the reservoir 24 may be used to measure the depth of submersion of the flowmeter below the main fluid surface 3. As externally mounted scales are no longer needed for this type of meter, they are removed but correspondingly greater weights 13 and 14 are included. Electronic sensors at 10 and 16 are used to relay depth and velocity information respectively. Alternatively the quantity of water in the float cells or flowmeter body may be adjusted by use of compressed air admitted by a hand pump or via a floating ball from which pressure readings may be taken to indicate the depth of immersion of the flowmeter.

Referring to FIG. 4, the type B flowmeter comprises a main upper body 1 with all appurtenances similar to that of the type A flowmeter described previously except for the internal sensitivity adjustment mass 14 which is not required for the Type B meter. The type B flowmeter however includes a smooth or threaded arm 27 extending from and fixed or releasably secured to the main body 1 and a lower streamlined body or bodies 28 which can be fixed or releasably secured at any position along the arm, by means of a screw thread or other clamping device. This lower body 28 may or may not be able to rotate to align its axis 29 with the direction of flow of the fluid 3. Sensitivity of velocity measurement by pointer 12 may be reduced by adding weights 14 or by allowing water to enter the lower body 28.

Referring to FIG. 5, the type C flowmeter is of fundamentally similar design to the type A flowmeter, but has a relatively short length of its body 1 so that it can readily be installed through holes trapped in existing closed conduits. For the type C flowmeter, the method of fixing or anchoring the flowmeter is different from the type A flowmeter as the body 1 with streamlined cross section is mounted horizontally across the width 30 of the conduit in which fluid flows and is free to rotate about the horizontal axis in a vertical plane, either being integral with a shaft mounted at each end or at one end through bearings 31 and 32, or able to rotate about a fixed shaft. The body 1 has a fixed chord length 33 or alternatively a chord length 34 varying symmetrically with distance from the center of the conduit and designed to ensure that the transmitter 35 output signal is proportional to the average flow rate in the conduit. Under conditions of zero flow the vane body 1 hangs vertically due to the effect of gravity, however for non-horizontal longitudinal sections of conduit, a pendulum 13 is adjusted angularly on the outer end of the vane shaft to ensure that the vane body 1 is perpendicular to the conduit axis during no-flow conditions. The pendulum 13 arm may be damped by immersion in a viscous fluid bath 36 mounted outside the conduit and adjusted radially for sensitivity. Referring to FIG. 6, movement of the vane body 1 from the perpendicular position 37 to the deflected position 38 is caused by the fluid flow in the direction shown. If the body 1 is of the type that is integral with of fixed to the shaft 9, the velocity of flow may be read directly off the externally mounted scale 39 as indicated by the pointer 40 in FIG. 5. For reverse flow a corresponding reverse deflection and negative reading on the scale is possible. Referring to FIG. 7, remote transmission of flow velocity is made possible by use of electronic techniques such as those discussed for type A and type B flowmeters, for example in this case a magnet 41 is located in the moving vane 1 close to the end bearing 32 while a Hall effect diode 42 is mounted on the inside of the fixed bearing shell so that a peak current is achieved when the vane 1 is in the no-flow position, the cable from the diode 42 passing through the wall of the conduit via a sealed hole 43 to an inverter/converter and transmitter 35 on FIG. 5. Temperature and power supply compensation may be made and the resultant signal being proportional to the flow rate can be fed in pulse or analogue form to totalizers, data loggers, recorders, etc.

The type D flowmeter which is similar in all respects to the above type C flowmeter except that the moving vane body is comprised of more than one substantially interlinked unit such as shown in the type B flowmeter is not generally useful in the case of closed conduits as access for adjustment is limited, however it is useful for experimental purposes where the chord lengths as shown on FIGS. 5 and 6 could be altered.

Referring to FIGS. 8 and 9, the type E flowmeter is substantially the same as the type A flowmeter, but has its body 1 in the form of a vane which can be folded or aligned to a horizontal position along its supporting shaft 9 axis to permit easy insertion through a relatively small diameter tapping in the conduit wall. One design which allows external adjustment of the vane position following insertion into the closed conduit is illustrated in which the manual rotation about its longitudinal axis of shaft 46 on the inner end of which is supported by and free to rotate about the end of shaft 9, being fitted a worm gear 47 causes the vane 1 which is fitted with driven gear 49 to rotate to its correct position with respect to the flow. The whole shaft and gear assembly should preferably be encased in a streamlined tube 50 for most of its length. Manual adjustment of the vane position relative to the shaft axis may be made by the knurled nut 44 mounted externally which rotates shaft 46 in FIG. 9 and may be locked by a second nut 45. The gears and shaft should be of non-corrosive material such as gun metal or nylon. The shafts would be mounted in low friction submerged bearings 51. A pressure cell 48 may be added close to the shaft head to transmit the force acting on the vane as an alternative method of velocity indication. It should be noted that type E flowmeter also provides a method of sensitivity adjustment as the degree of deflection of the vane will depend on its angle with respect to the shaft axis; this would therefore permit a standard size of flowmeter to be developed for measuring a wide range of pipe velocities.

Referring to FIG. 10, the type F flowmeter for open channel flow has a floating body 56 with fixed tail fin 52 and longitudinal slots through the center of the body not shown. A rigid trapezoidal frame 53 is fixed or releasably secured to the body 56 and supports two pendulums 13, an anchor arm 8 and a tailing friction body 27 of circular or streamlined cross section all freely hinged at the upper ends. The anchor arm 8 passes through the body slot and in turn is attached to the anchor tie 7 at its lower end and thence to an anchor 6 which rests on channel bed 5, this assembly adopting an angular displacement relative to the pendulums 13 depending on the depth of water in the channel. The friction body 27 also passes through the body slot and into the liquid in the channel adopting an angle relative to the pendulums which will depend on the velocity of flow of the liquid relative to the float. Both anchor arm 8 and friction body 27 are hingedly fixed to weak helicoidal compression springs 54 which are in turn each hingedly fixed to load cells 55 fixed or releasably secured to the two pendulums 13 so that one load cell measures the load due to the velocity displacement of body 27 while the other measures the load due to the depth displacement of arm 8. The load cells may conveniently consist of electronic digital balances wired via transmitters to the input of a computer for which appropriate software can be used to provide linear velocity and depth readouts or to data storage units for further analysis. The above system would be less sensitive to low flow velocities than the type A flowmeter, but would be easy to maintain and operate.

The foregoing detailed descriptions have been given for clearness of understanding only and no necessary limitations should be understood therefrom as some modifications will be obvious to those skilled in the art.

I claim:

1. A liquid flow measuring device for determining the flow of a liquid comprising:
   (a) a streamlined body having a leading and a trailing end, with at least a portion of the body proximate the trailing end being disposed within a liquid to be measured, the body being pivotable about a horizontal axis proximate the leading end which is substantially perpendicular to the direction of flow of the liquid, the body having a no-flow orientation indicating a null flow condition of the liquid and being pivotable from the no-flow orientation by frictional forces subjected on the body by the flowing liquid such that the body has an angular displacement from the no-flow orientation proportional to the flow of the liquid; and
   (b) a mobile reference pendulum pivotable about the horizontal axis to provide a no-flow reference point, the pendulum being arranged and configured such that it is unaffected by frictional forces from the flowing liquid.

2. The device of claim 1, further comprising means for measuring the angular displacement of the body from the no-flow orientation.

3. The device of claim 1, wherein the body further comprises a plurality of weights, each weight being movable about a longitudinal axis extending from proximate the leading end to proximate the trailing end, whereby the sensitivity of the body to frictional forces is adjustable by moving at least one of the weights along the longitudinal axis.

4. A liquid flow measuring device for determining the flow of a liquid comprising:
   (a) a streamlined body having a leading and a trailing end, with at least a portion of the body proximate the trailing end being disposed within a liquid to be measured, the body being pivotable about a horizontal axis proximate the leading end which is substantially perpendicular to the direction of flow of the liquid, the body having a no-flow orientation indicating a null flow condition of the liquid and being pivotable from the no-flow orientation by frictional forces subjected on the body by the flowing liquid such that the body has an angular displacement from the no-flow orientation proportional to the flow of the liquid; and
   (b) means for measuring the depth of liquid in a channel bed comprising an arm pivotable about the horizontal axis of the body and a line of fixed length having one end affixed to the arm and the other end anchored to a bottom surface of the channel bed.

5. The device of claim 4, further comprising a floating body, wherein the streamlined body is pivotally attached to the floating body along the horizontal axis, and wherein the floating body is comprised of means for measuring the angular displacement as a function of the load applied by the frictional forces on the streamlined body.

* * * * *